(12) United States Patent
Kluft

(10) Patent No.: US 6,757,055 B1
(45) Date of Patent: Jun. 29, 2004

(54) METHOD AND DEVICE FOR MEASURING PROCESS PARAMETERS OF A MATERIAL WORKING PROCESS

(76) Inventor: Werner Kluft, Ellerstrasse 43, 52078 Aachen (DE)

(*) Notice: Subject to any disclaimer, the term of this patent is extended or adjusted under 35 U.S.C. 154(b) by 483 days.

(21) Appl. No.: 09/708,660

(22) Filed: Nov. 9, 2000

(30) Foreign Application Priority Data

Nov. 12, 1999 (EP) .............................................. 99122600

(51) Int. Cl.$^7$ ............................................... G01N 21/00
(52) U.S. Cl. ...................................................... 356/73
(58) Field of Search .................... 356/71–73, 625–640, 356/237.1; 219/121.83, 121.63, 121.64

(56) References Cited

U.S. PATENT DOCUMENTS 5,869,805 A * 2/1999 Beyer et al. ........... 219/121.83

FOREIGN PATENT DOCUMENTS

DE 197 41 329 C1 10/1998

* cited by examiner

Primary Examiner—Tu T. Nguyen
(74) Attorney, Agent, or Firm—Diller, Ramik & Wight

(57) ABSTRACT

For a method for measuring process parameters of a material working process using a high energy beam (2), in particular a laser beam, focused onto a working zone of a workpiece (8), by measuring coaxially to the high energy radiation in the workspace zone the light intensity in the area of vapor capillaries (14) produced by then high energy beam (2) by means of an optical sensor (10) scanning a picture field and supplying the resultant measuring signals to an evaluation means (18), an optical sensor (10) having a dynamic range of more than 70 db is used, and the measuring signals of sections of the picture field showing the area of the vapor capillaries (14) and at least the area of the melting zone (20) surrounding the vapor capillaries (14) are simultaneously transmitted to the evaluation means (18).

22 Claims, 4 Drawing Sheets

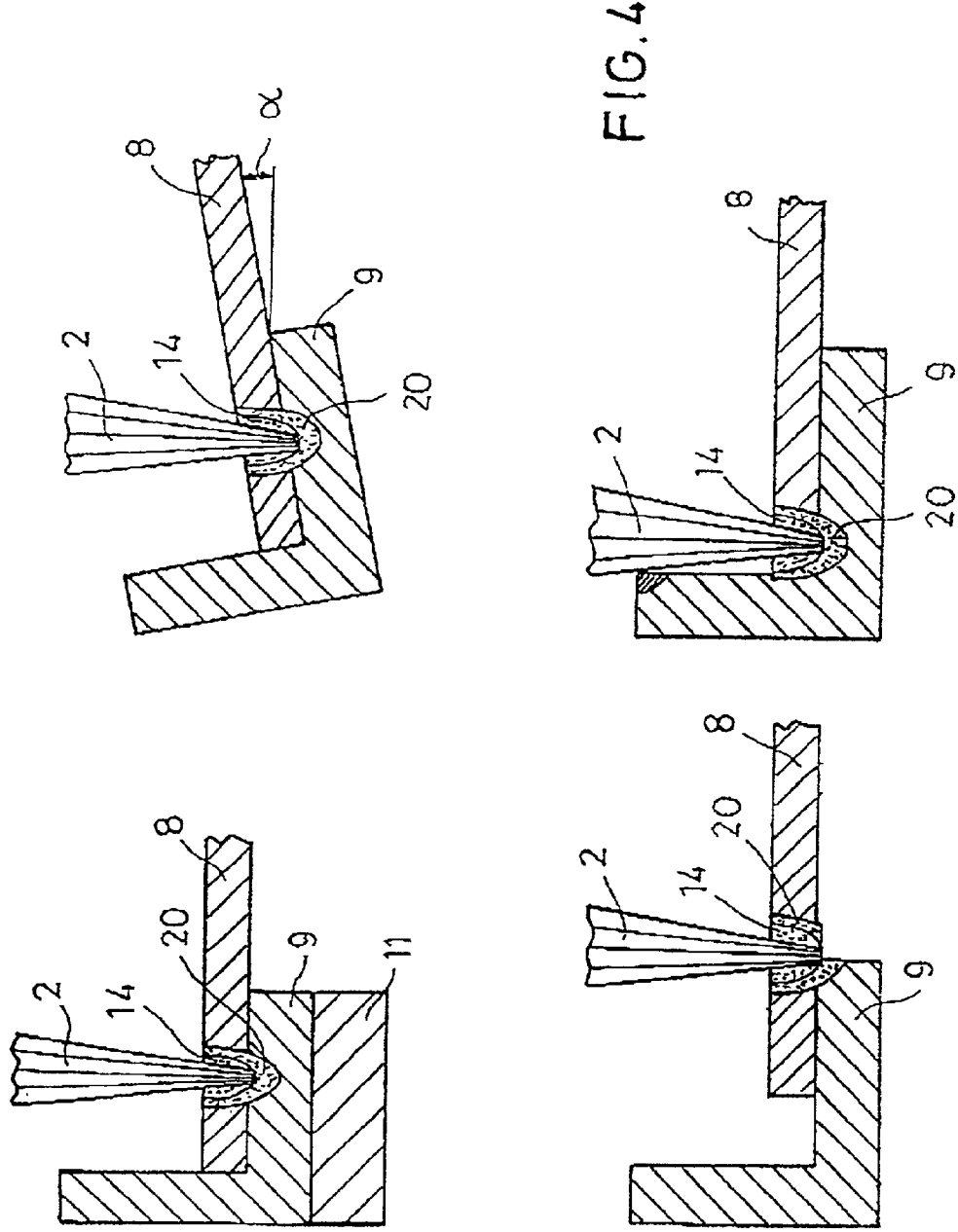

METHOD AND DEVICE FOR MEASURING PROCESS PARAMETERS OF A MATERIAL WORKING PROCESS

BACKGROUND OF THE INVENTION

The present invention relates to a method and a device for measuring process parameters of a material working process.

High energy beams, in particular laser beams, are used in different ways for material working purposes, for example for cutting, boring and welding different types of material and workpiece geometries. What is common to all processes is that prior to the working process the workpiece is melted and/or partially vaporized. Conversion of the material to be worked into different states of aggregation frequently leads to material defects and process changes during material working. In particular processes during which the material passes through all three states of aggregation, namely the solid, liquid and vapourous states of aggregation, are influenced by a plurality of process parameters.

Below the process parameters influencing the weld geometry during laser welding are stated by way of example:

Weld preparation:
  for example edge preparation, material pairing, type of joint
Process control:
  for example employment of an additional wire, rate of feed, inert and operating gas
Properties of the working means:
  for example guiding of the laser beam, optical focusing device, reproducibility of weld track
Process parameters of the laser means:
  for example laser performance, stability of laser performance, beam quality Further, the development in the automobile sector necessitates more and more complex working geometries which require guidance of the high energy radiation.

To guarantee reproducible working quality, on-line monitoring of the working process is required during which the relevant process parameters are measured and used for controlling the material working process.

From DE 197 41 329 C a method and a device for metal working using plasma-induced high energy radiation is known where the area of the vapour capillaries is monitored for example by a CCD camera for the purpose of controlling and monitoring the working process. In this connection it is envisaged to monitor the area of the vapour capillaries at at least two measuring points to obtain different capillary geometry sizes. Specific areas of the picture taken by the CCD camera are evaluated for determining the capillary geometry sizes. Since all picture data must be transmitted to the evaluation means first, measurement at high monitoring frequency is not possible. Further, the known process does not allow the vapour capillary environment to be monitored such that further independent monitoring and control systems are required for optimized process control.

It is the object of the present invention to provide a method and a device of the aforementioned type for simultaneously acquiring a plurality of process parameters at a high monitoring frequency using a single monitoring means.

SUMMARY OF THE INVENTION

The present invention advantageously provides an optical sensor having a dynamic range of more than 70 dB. Such a sensor is capable of simultaneously sensing the area of the vapour capillaries, the melting zone surrounding the vapour capillaries and possibly also a border zone surrounding the melting zone, and allows the measuring signals to be evaluated despite the high contrast range of the picture produced. This allows measuring signals from different sections of the picture field to be simultaneously evaluated for the purpose of determining the process parameters. Since only the measuring signals of sections of the picture field are transmitted to the evaluation means a high monitoring frequency of more than 1 kHz is attainable as the amount of measuring signal data used for evaluation purposes is kept small.

In the picture field sensed by the optical sensor preferably different freely selectable picture sections are defined with exclusively the measuring signals of these picture sections being simultaneously evaluated for the purpose of determining different process parameters which are to be monitored.

Free selection of the picture sections allows a maximum of flexibility with regard to configuration of a monitoring system. Monitoring of specific areas of the melting zone is of importance insofar as the molten mass is fed from the hotter region around the vapour capillaries to the more distant end of the melting zone. Here said molten mass cools down and solidifies. Obviously the hot material is transported at irregular intervals, which affects solidification of the molten mass and may lead to discontinuities and defects in the weld. Thus monitoring of the solidification front at the end of the melting zone is essential with regard to detection of defects occurring in connection with material solidification, for example surface roughness, weld convexity, holes, surface pores etc. Detection of such defects would not be possible by monitoring the vapour capillaries alone.

Measuring signals of picture sections showing the area of the melting zone in front of and at the side of the vapour capillaries may be used for detecting defects occuring during weld preparation.

Measuring signals of picture sections showing the area of the melting zone upstream of the working zone, as seen in the working direction, or the border zone upstream of the melting zone may be used for measuring the weld location and for controlling the laser position or workpiece position. A combination of capillary monitoring, weld zone monitoring and weld tracking offer the user the advantage that all monitoring and control functions can be performed with a single monitoring and control system, which also facilitates operation of the control unit.

The penetration depth of the high energy beam can be detemined from a reduced number of pixles of a picture section showing the center of the vapour capillaries.

The measuring signals of a picture section showing the melting zone downstream of the vapour capillaries, as seen in the working direction, and/or a border area downstream of the melting zone, as seen in the working direction, may be used for measuring the surface topography of the workpiece subjected to the working process.

For special monitoring tasks it is possible to provide a filter in addition to the optical sensor in the beam path such that light with predetermined wavelengths can be filtered.

A CMOS camera is preferably used as optical sensor. The CMOS technology allows pixles of the picture field to be evaluated independently of the overall picture whereby the amount of measuring signal data can be advantageously reduced to a minimum. It is not necessary to acquire all measuring signal data first and then to selectively evaluate them. In this way a high monitoring frequency of more than 1 kHz is attainable.

For this purpose preferably an optical sensor having a dynamic range of more than 100 dB is used.

The focal position of the high energy beam can be determined by measuring the change in light intensity in a linear or rectangular picture section which linearly extends through the vapour capillaries and the two neighboring melting zones.

BRIEF DESCRIPTION OF THE DRAWINGS

Hereunder embodiments of the present invention are explained in detail with reference to the drawings in which:

FIG. 4 shows examples of different working defects.

DESCRIPTION OF THE PREFERRED EMBODIMENTS

Figure 1:
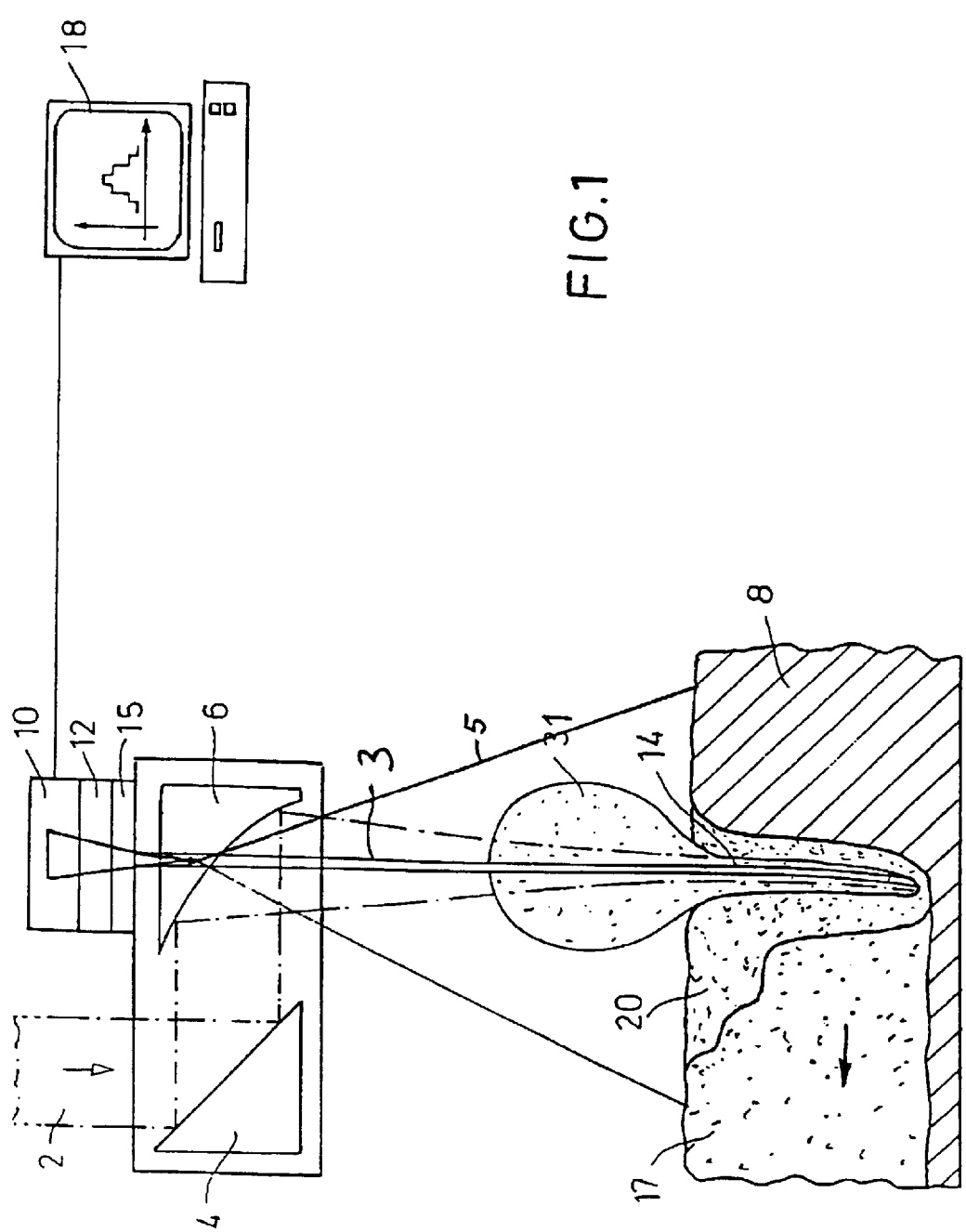
FIG. 1 shows a diagrammatic representation of a device according to the invention.

FIG. 1 shows the working of a metal workpiece 8 using a laser beam 2 which is focused onto the workpiece 8 with the aid of a reflecting mirror 4 and a focusing mirror 6. A CMOS camera 10 having an optical device 12 is arranged above the focusing mirror 6, the camera monitoring the working zone of the workpiece 8 coaxially to the focused laser light beam 2 via the focusing mirror 6. For this purpose the focusing mirror 6 may be provided with a corresponding perforation which allows passage of the beam or may be at least partially transparent to the monitored light wavelengths. The drawing diagrammatically shows a measuring beam 3 within a measuring cone 5 of the CMOS camera 10, the measuring beam 3 sensing vapour capillaries 14 in the workpiece 8 with regard to the emitted light intensity. Said vapour capillaries 14 are produced by heating and vaporization of the workpiece 8 material and form a deepened portion in the workpiece 8, whose capillary geometry size values are evaluated with the aid of the CMOS camera 10 and an evaluation device 18 for the purpose of process control. Beyond the beam 3 path the measuring cone 5 of the CMOS camera 10 senses, prior to the working process and in the area of the weld 17, a picture field which does not only show the vapour capillaries 14 but also the melting zone 20 surrounding the vapour capillaries 14 and a border zone beyond the melting zone 20. The plasma cloud 31 shown in FIG. 1 is transparent for the purpose of the envisaged measurements.

As can be seen from FIG. 1 it is assumed in the diagrammatic representation that the workpiece 8 is moved relatively to the high energy beam 2 in the direction indicated by an arrow. Of course, the workpiece 8 may also be stationary and moved into the means for producing high energy beams, for example a laser means.

Between the CMOS camera 10 and the focusing mirror 6 a filter 15 may be arranged if certain light wavelengths are to be excluded from the measurement.

The CMOS camera 10 has a dynamic range of approximately 120 dB such that both the gaseous phase and the melting phase and possibly also the solid phase of the workpiece 8 can be simultaneously monitored and measured during the working process.

The CMOS technology allows individual pixles to be evaluated independently of the overall information of the picture field such that only certain freely selectable picture sections within the picture field scanned by the camera and of the picture produced by the camera 10 are transmitted to the evaluation means 18 for evaluation purposes. For on-line determination and evaluation of all process variables required for monitoring and control at a monitoring frequency of at least 1 kHz a data reduction is performed. This is done on the basis of specific features which are characteristic of the corresponding process variables.

For example, the penetration depth of the laser beam 2 entering the workpiece 8 can be determined on the basis of a few pixles, the radiation from the center of the vapour capillaries 14 being projected to said pixles.

Figure 2:
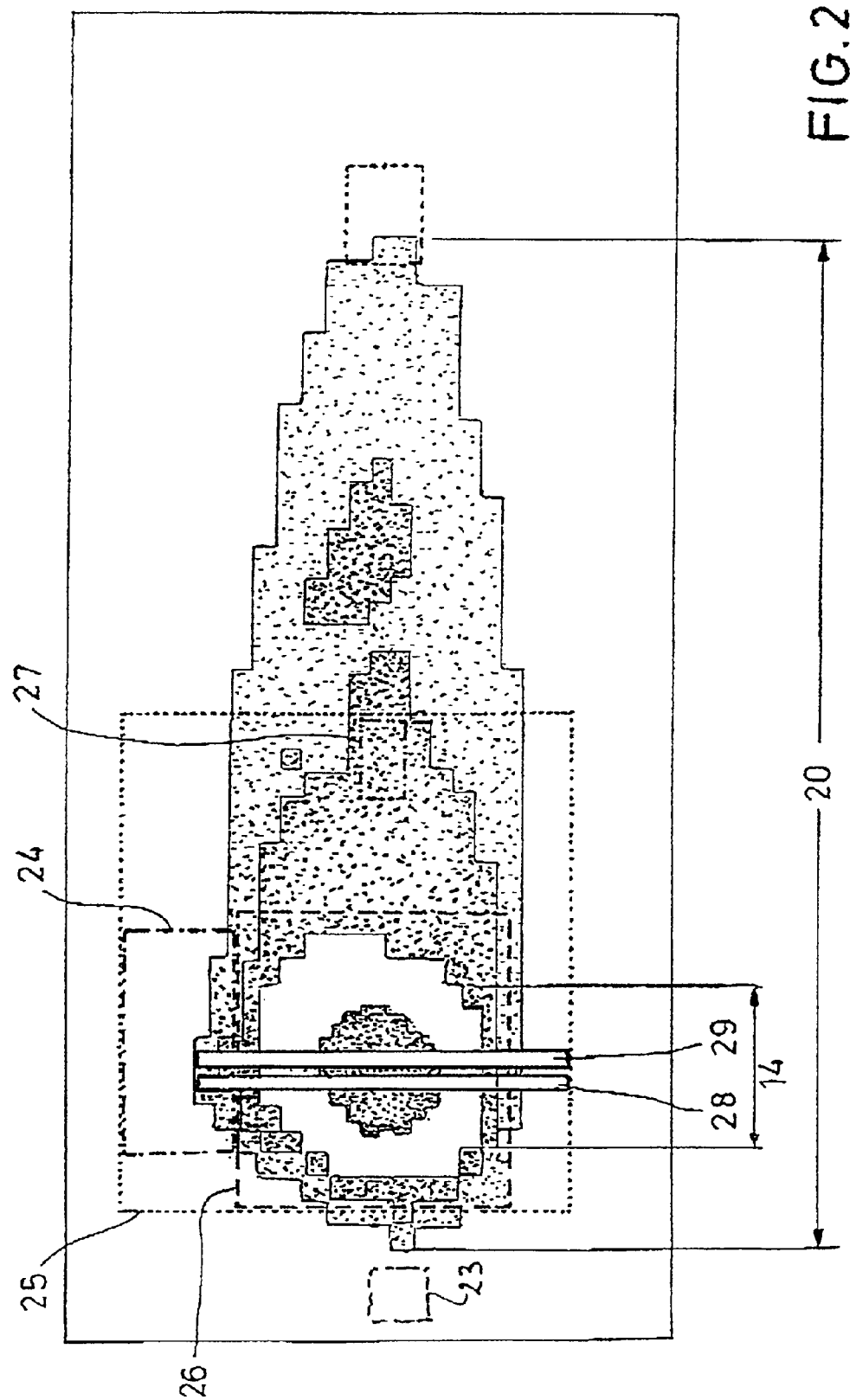
FIG. 2 shows the picture field produced by a CMOS camera showing selected picture sections.

FIG. 2 shows the picture field monitored by the CMOS camera 10 including the area of the vapour capillaries 14, the area of the melting zone 20 and the border area surrounding the melting zone 20. The picture distinctly shows the vaporous, liquid and solidified areas. The area of the vapour capillaries 14 may include a plasma cloud 31, as can best be seen in FIG. 1.

Monitoring of the solidification front at the end of the melting zone 20 may be of importance for detection of defects occurring in connection with material solidification. For example, such defects may include surface roughness, weld convexity, holes or surface pores.

Such working defects occur during material solidification in the molten pool of the working process. They generally occur in the zone of direct interaction between the laser beam 2 and the workpiece 8 but normally the occurrence of said defects cannot be monitored in this zone. Insofar simultaneous monitoring of the melting zone 20 or specific picture sections of the melting zone 20 is of great importance.

In FIG. 2 various picture sections 23 to 30 are shown which are designed to monitor different process parameters of the working process. For example, the picture section 27 serves for the detection of defects occurring during weld preparation. In this case monitoring may be limited to the picture section 25. To allow rapid on-line monitoring only the pixles of the correspondingly selected areas are analysed by means of simple algorithms, such as the overall intensity of the area or the intensity difference between two pixles. With the aid of picture sections 26 and 28 the penetration depth of the laser beam can be monitored. Using the picture section 28 a considerable reduction of the amount of data can be carried out, for example by a row of pixles monitoring the vapour capillary 14 area transversely to the working direction. Using picture section 24 a positioning error as is shown below on the right in FIG. 4 can be detected.

By means of picture section 30 the surface topography of the solidified working zone downstream of the melting zone 20 can be monitored.

Picture section 23 can for example be used for weld tracking such that during the working process complicated contours can be tracked by scanning a predetermined track and correspondingly controlling the laser beam 2.

By means of picture section 29 which may be congruent with the picture section 28 but may also extend at an angle to picture section 28 the focal position of the laser beam can be monitored. For this purpose a narrow picture section extending transversely through the vapour capillaries 14 is selected.

Figure 3:
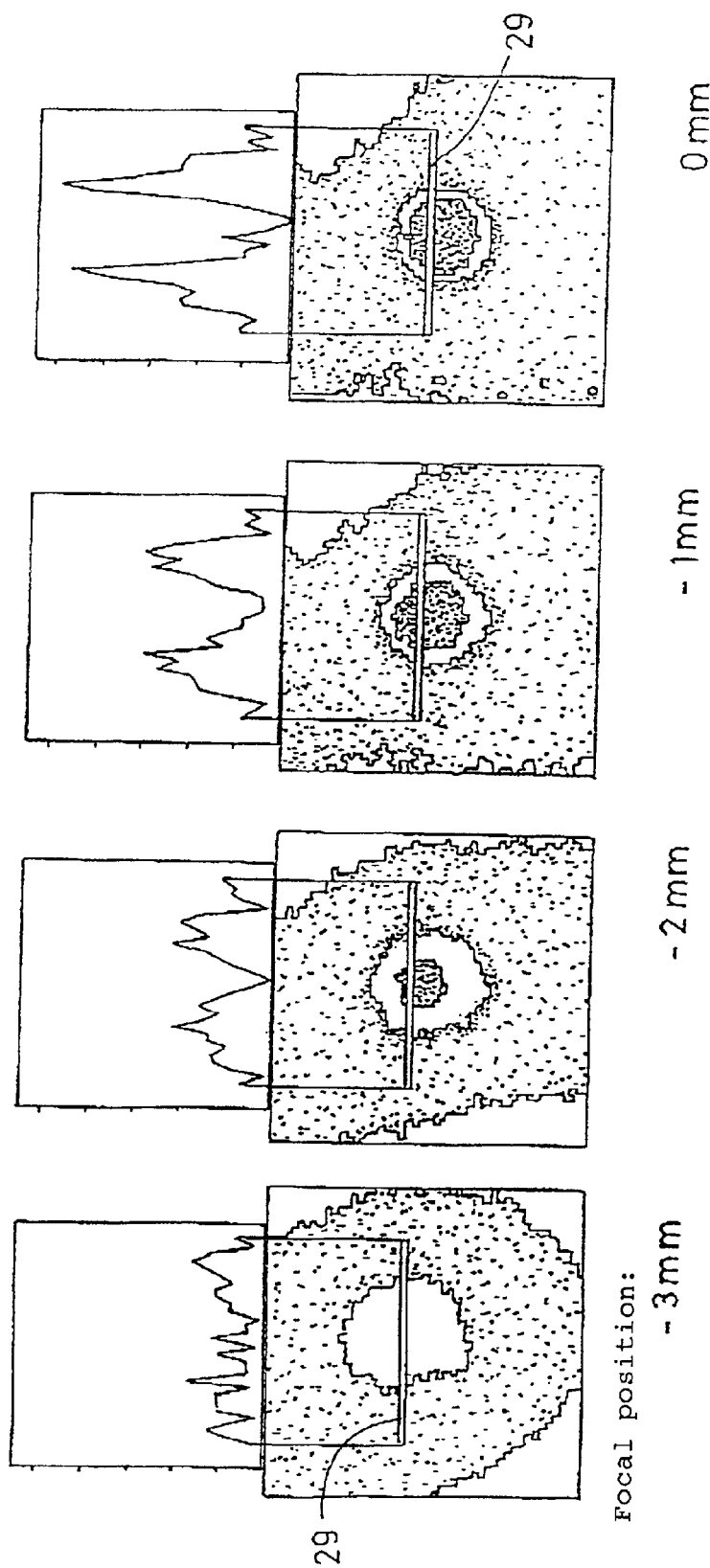
FIG. 3 shows an example of determination of the focal position of a laser light beam.

FIG. 3 shows four different focal positions, and above the graphical representation the measuring signals are shown over the length of picture section 29. The first derivation of the measuring signal values is used for evaluating the focal position, that is the rate of change in the light intensity along picture section 29. The picture on the right side in FIG. 3 shows the optimum focal position which is characterized by two pronounced maximum values. In this connection reaching of a maximum value is monitored.

FIG. 4 shows four applications of the process described. The picture at the upper left in FIG. 4 shows the correct position of the two workpieces 8, 9 to be welded with a third heat-sensitive part 11 being arranged below the second workpiece 9. In this case it is of importance that the penetration depth of the laser light beam 2 is exactly monitored.

The picture at the upper right in FIG. 4 shows a defect which occurred during weld preparation, i. e. the workpieces 8 and 9 to be joined with each other extend at an angle α to the axis of the laser light beam 2. In this case monitoring of the focal position helps to easily detect whether the focal position has changed and thus the workpieces 8,9 have been incorrectly clamped.

The picture below on the left in FIG. 4 shows an undesired offset between the first workpiece 8 and the second workpiece 9 such that undesired full penetration welding may occur in the working zone. Such a working defect can for example be detected with picture section 27.

The picture below on the right in FIG. 4 shows a working defect, namely the laser light beam erroneously touching the second workpiece 9. Such a working defect can be detected via picture section 24 shown in FIG. 2.

Although preferred embodiments of the invention have been specifically illustrated and described herein, it is to be understood that minor variations may be made in the device and method without departing from the spirit and scope of the invention, as defined in the appended claims.

What is claimed is:

1. A method of measuring process parameters of a material working process using a high energy beam (2), in particular a laser beam, focused onto a working zone of a workpiece (8) by measuring with an optical sensor (10) the light intensity emitted from the workpiece substantially coaxially to high energy radiation directed toward the working zone in an area of vapour capillaries (14) produced by the high energy beam (2), the optical sensor (10) sensing a picture field and transmitting the measuring signals to an evaluation means (18), wherein the optical sensor (10) has a dynamic range of more than 70 db, and measuring signals of sections of (a) an image field showing the area of the vapour capillaries (14) and (b) at least an area of a melting zone (20) surrounding the vapour capillaries (14) which are simultaneously transmitted to the evaluation means (18).

2. Method according to claim 1 wherein in the picture field sensed by the optical sensor (10) different picture sections (24 to 29) are freely selectable and exclusively the measuring signals of these picture sections are used for simultaneous determination of different process parameters to be monitored.

3. Method according to claim 2 wherein the measuring signals of picture sections (27) showing the area of the melting zone (20) in front of or at the side of the vapour capillaries (14) are used for detecting defects occurring during weld preparation.

4. Method according to claim 2 wherein the measuring signals of a picture section (23) showing the melting zone (20) upstream of the working zone, as seen in the working direction, or the border area upstream of the melting zone (20) are used for measuring weld location and for controlling the laser position or the workpiece position.

5. Method according to claim 1 wherein the penetration depth of the high energy beam (2) is determined on the basis of a reduced number of pixels of a picture section (28) showing the center of the vapour capillaries (14).

6. Method according to claim 2 wherein the measuring signals of one of (a) a picture section (30) taken in the melting zone (20) downstream of the vapour capillaries (14), as seen in a working direction, and (b) downstream of the melting zone (20), as seen in the working direction, are used for measuring the surface topography of the workpiece (8) subjected to the working process.

7. Method according to claim 2 wherein measuring data of the different picture sections (23 to 30) are subjected to data reduction.

8. Method according to claim 1 wherein light of certain wavelengths in a beam path to the optical sensor (10) is filtered.

9. Method according to claim 1 wherein a CMOS camera is used as optical sensor (10).

10. Method according to claim 1 wherein by measuring the light intensity in the vapour capillaries (14) and by measuring the light intensity at at least one selected place of the melting zone respective capillary parameters and molten pool parameters are simultaneously determined for controlling the working process as a function of the determined capillary parameters and the determined molten pool parameters.

11. Method according to claim 1, wherein the optical sensor (10) has a dynamic range of more than 100 dB.

12. Method according to claim 1 wherein the focal position of the high energy beam (2) is determined by measuring the changes in light intensity in a linear or rectangular picture section (29) extending through the vapour capillaries (14) and the neighboring melting zones (20).

13. Method according to claim 1 wherein the measuring signals of selected pixels are used for monitoring or process control purposes.

14. A device for measuring process parameters of a material working process comprising means for producing a high energy beam (2), focusing means (6) for focusing the high energy beam (2) onto a working zone of a workpiece (8), an optical sensor (10) for measuring emitted light intensity of vapour capillaries (14) produced in the working zone, the sensor (10) being focused coaxially to the direction of the high energy beam (2) onto the working zone of the workpiece (8), evaluation means (18) for evaluating the measuring signals of the scanned picture field supplied by the optical sensor (10), and the optical sensor (10) having a dynamic range of more than 70 dB for simultaneously transmitting to the evaluation means (18) measuring signals of sections of (a) an image field showing an area of the vapour capillaries (14) and (b) at least an area of the melting zone (20) surrounding the vapour capillaries (14).

15. Device according to claim 14 wherein the evaluation means (18) receives only measuring signals of picture sections of the picture field covering, in addition to the area of the vapour capillaries (14), at least an area of the melting zone (20) surrounding the vapour capillaries (14).

16. Device according to claim 14 wherein the optical sensor (10) is a CMOS camera.

17. Device according to claim 14 wherein the evaluation means (18) evaluates the picture signals of a plurality of different picture sections (24 to 30) of the picture field scanned by the sensor (10) with regard to predetermined process parameters.

18. Device according to claim 14 wherein near the vapour capillaries (14), the evaluation means (18) senses, for the purpose of measuring the penetration depth of the high energy beam (2), a predetermined reduced number of pixels showing the area of the high energy beam (2).

19. Device according to claim 17 wherein the evaluation means (18) evaluates the measuring signals of picture sections (24, 27) showing the area of the melting zone (20) downstream of and at the side of the vapour capillaries (14), as seen in the working direction, for the purpose of detecting defects occurring during weld preparation.

20. Device according to claim 17 wherein the evaluation means (18) evaluates the measuring signals of picture sections taken in the melting zone (20) downstream of the vapour capillaries (14), as seen in the working direction, or downstream of the melting zone (20), as seen in the working direction, for the purpose of measuring the surface topography.

21. Device according to claim 17 wherein the evaluation means (18) evaluates the measuring signals of a picture section (29) extending linearly or rectangularly through the vapour capillaries (14) and the neighboring melting zone (20) for determining the focal position of the high energy beam (2).

22. Device according to claim 14 wherein a filter (15) is arranged in the beam path to the optical sensor (10) by means of which filter (15) specific wavelengths of the light received can be blocked.

* * * * *